United States Patent
Brieko

(10) Patent No.: US 6,328,199 B1
(45) Date of Patent: Dec. 11, 2001

(54) METHOD FOR CONNECTING A FIRST OBJECT TO A SECOND OBJECT WHICH HAS A PARTLY OPEN STRUCTURE

(75) Inventor: Meindert Willem Brieko, St. Maarten (NL)

(73) Assignee: Stichting Energieonderzoek Centrum Nederland (NL)

( * ) Notice: Subject to any disclaimer, the term of this patent is extended or adjusted under 35 U.S.C. 154(b) by 0 days.

(21) Appl. No.: 09/600,634

(22) PCT Filed: Jan. 15, 1999

(86) PCT No.: PCT/NL99/00025
§ 371 Date: Jul. 20, 2000
§ 102(e) Date: Jul. 20, 2000

(87) PCT Pub. No.: WO99/37434
PCT Pub. Date: Jul. 29, 1999

(30) Foreign Application Priority Data

Jan. 23, 1998 (NL) .................................................. 1008103

(51) Int. Cl.[7] .................................................. B23K 31/02
(52) U.S. Cl. ............................ 228/245; 228/254; 228/261
(58) Field of Search .................................. 228/245, 253, 228/254–261; 219/121.47

(56) References Cited

U.S. PATENT DOCUMENTS

| | | | |
|---|---|---|---|
| 3,852,873 | * | 12/1974 | Chartet . |
| 4,301,354 | * | 11/1981 | Williams . |
| 5,458,984 | * | 10/1995 | Negwer . |
| 5,746,594 | * | 5/1998 | Jordan et al. . |
| 5,780,116 | * | 7/1998 | Sileo et al. . |
| 5,820,939 | * | 10/1998 | Popoola et al. . |
| 6,047,876 | * | 4/2000 | Smith . |
| 6,254,938 | * | 7/2001 | Pranevicius et al. . |

* cited by examiner

Primary Examiner—Tom Dunn
Assistant Examiner—Jonathan Johnson
(74) Attorney, Agent, or Firm—Michael D. Bednarek; Shaw Pittman LLP

(57) ABSTRACT

Method for connecting a first object to a second object along a common contact surface, wherein the first object comprises at the location of the contact surface a portion for a connecting means to be applied, which portion is accessible along an edge zone of or via at least one opening in the second object, by means of thermal spraying of particles of a material suitable as connecting means onto the first object along the edge zone of respectively via the at least one opening in the second object in a quantity such that in solidified state the deposited material particles form a connection between the first and the second object, in addition to a convector element manufactured according to this method.

16 Claims, 2 Drawing Sheets

Figure 1A:
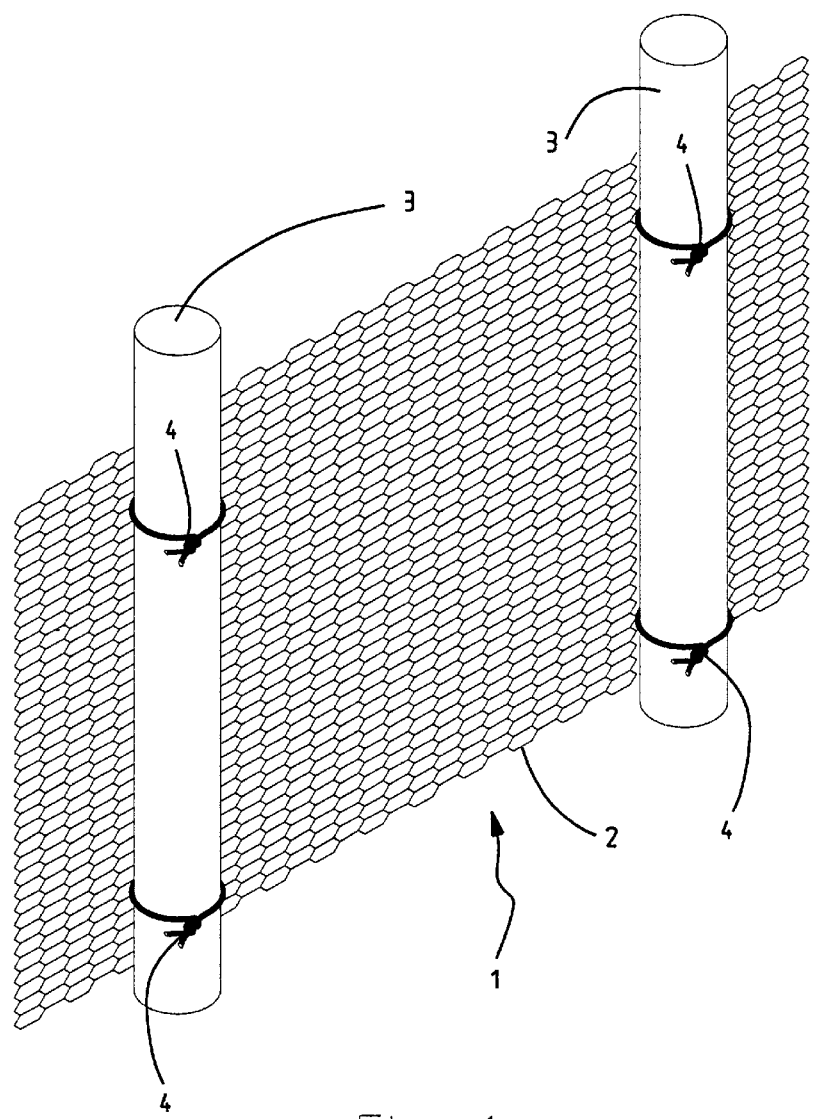

METHOD FOR CONNECTING A FIRST OBJECT TO A SECOND OBJECT WHICH HAS A PARTLY OPEN STRUCTURE

The invention relates to a method for connecting a first object to a second object along a common contact surface, wherein the first object comprises at the location of the contact surface a portion for a connecting means to be applied, which portion is accessible along an edge zone of or via at least one opening in the second object.

According to the prior art solderable metal objects which have to be mutually connected are usually soldered. The soldering process requires a good metallic contact between the objects for soldering, which must each be brought in their entirety to a temperature suitable for soldering, for instance 250° C. This requirement results in considerable energy costs, particularly in the case of large objects or objects which are soldered according to a continuous process in a belt furnace. During soldering a solder material is used which produces a harmful vapour at said soldering temperature with all the associated risks or adverse consequences for health and environment.

A further drawback of the soldering technique is that it is inherently limited to solderable materials and is unsuitable for connecting a metal such as for instance aluminium, which is a particularly suitable metal for many applications because of its low density and good thermal conductivity.

Another drawback of the soldering technique is that, as a result of the use of solder flux, soldered connections are extremely susceptible to galvanic corrosion in determined weather conditions, so that soldered connections are insufficiently durable under determined conditions.

It is an object of the invention to provide a method for durable connection of objects, in particular metal objects, according to which it is not necessary to heat each of the objects in their entirety and wherein no harmful vapour is released and use of which is not limited to objects of solderable metals.

These objects are achieved and other advantages gained with a method of the type stated in the preamble, which method according to the invention comprises the successive steps of (i) providing a first and a second object,
(ii) holding the first object against the second object along a common surface,
(iii) melting and atomizing particles of a material suitable as connecting means, and
(iv) depositing along the edge zone respectively via the at least one opening the material particles in molten state on the first object and on the edge zone respectively the edges of said opening, in a quantity such that in solidified state the deposited material particles form a connection between the first and the second object.

Melting and atomizing of particles is per se known as thermal spraying. Thermal spraying is a technique wherein a layer of a material, generally a metal, is applied to a substrate by melting the material and atomizing it in fine droplets in the direction of the object for covering. Thermal spraying is used to provide materials with a coating, for instance to make the surface of these materials wear-resistant and/or corrosion-resistant. Surprisingly, it has now been found that the per se known technique of thermal spraying is not only suitable for coating a single object, but is likewise suitable for connecting two objects.

The advantages of connecting objects by means of thermal spraying are numerous when compared to soldering.

It is not necessary to bring both objects in their entirety to a soldering temperature, which results in a considerable saving of energy costs. Furthermore, in the connection by means of thermal spraying the effective contact surface between the objects for connecting is larger than in the case of a corresponding solder connection.

Further cost-savings are realized in that the connecting material required for a connection according to the spraying technique is appreciably cheaper that the connecting material required for a comparable solder connection.

A further advantage of the connecting technique according to the invention is the absence of harmful vapours.

A further significant advantage is the possibility of also mutually connecting objects of materials which are not solderable or only solderable with difficulty, for instance aluminium.

The connections made according to the invented method are corrosion-resistant and durable and, with a suitable choice of material, have very good heat-conducting properties.

The methods for melting and atomizing particles designated by the term thermal spraying can be distinguished into atomizing of already liquid material from a crucible, so-called wire spraying wherein a wire of the material for spraying is melted in a gas-oxygen flame, an electric arc or a plasma torch and is subsequently atomized with air or another gas, and so-called powder spraying, wherein the material for spraying is supplied in powder form to the flame, arc or torch and is subsequently atomized.

In accordance with the manner of supplying the heat required for melting the material for atomizing, methods for thermal spraying can be further sub-divided into flame spraying with a gas-oxygen flame, electric arc spraying, plasma spraying and other methods for thermal spraying.

In an advantageous embodiment the method according to the invention comprises arc or plasma spraying in the third step (iii).

In another advantageous embodiment the third step (iii) comprises powder or wire spraying.

A material suitable as connecting means is for instance a material which can be atomized with a flame spraying process.

The material suitable as connecting means has for instance a melting point or an upper limit of a melting range at a temperature below 2400° C., preferably at a temperature below 600° C., more preferably at a temperature below 150° C.

It has been found that the material suitable as connecting means in a method according to the invention contains at least one of the metals aluminium, chromium, iron, nickel, copper, zinc, molybdenum, palladium, silver, indium, tin, antimony, lead or an alloy of at least one of these metals.

The invention is applied in advantageous manner when the portion of the first object accessible for the connecting means is porous, wherein the pores have dimensions such that the material deposited and solidified in the fourth step (iv) forms a mechanical connection due to anchoring of this material in these pores.

The porous portion is herein obtained for instance by forming an alloy layer of a material suitable as connecting means with a portion of the first object.

In yet another embodiment the porous portion is obtained by forming a coating layer of a material suitable as connecting means on a portion of the first object.

Yet another advantageous method has the feature that the second step (ii) is performed immediately preceding and synchronously with the third step (iii). This method can for instance be applied in a continuous process, wherein the first object is fixed against the second object by a pressure roller on the first object directly preceding the location where the connection is thermally sprayed.

The method according to the invention is particularly suitable for connecting objects of which at least the first object or the second object is manufactured substantially from a metal at the location of the contact surface.

The metal is for instance selected from the group comprising aluminium, chromium, iron, nickel, copper, molybdenum, palladium, silver, indium, gold, tungsten and an alloy of at least one of these metals.

The method according to the invention provides particular advantages in the connection of a tubular object, for instance a liquid conduit pipe, to a gauze-like support structure, for instance a heat-conducting metal gauze, along a common contact surface, wherein according to the invention in the fourth step (iv) metal particles are deposited onto the tubular object via the mesh in the gauze-like support.

It is thus possible in simple and exceptionally inexpensive manner to manufacture a convector element which can for instance be arranged in a system ceiling for the purpose of space heating. The investment costs for an installation for manufacturing such a convector element, wherein the liquid conduit pipe is connected to the support structure by means of thermal spraying according to the invention, are appreciably lower than the costs of a corresponding installation for soldering.

The process costs, i.e. the costs of the connecting material and the costs of gas and electricity, are considerably lower in the case of connection by means of thermal spraying than when a similar connection is made by means of soldering, while in thermal spraying no harmful vapours with an environmental impact are released and the resulting connection is corrosion-resistant and therefore durable.

The invention further relates to a convector element comprising a heat-conducting metal gauze and at least one liquid conduit pipe connected thereto which is obtained with a method according to the invention.

The present invention will be elucidated hereinbelow with reference to the annexed drawings.

In the drawings

Figure 1B:
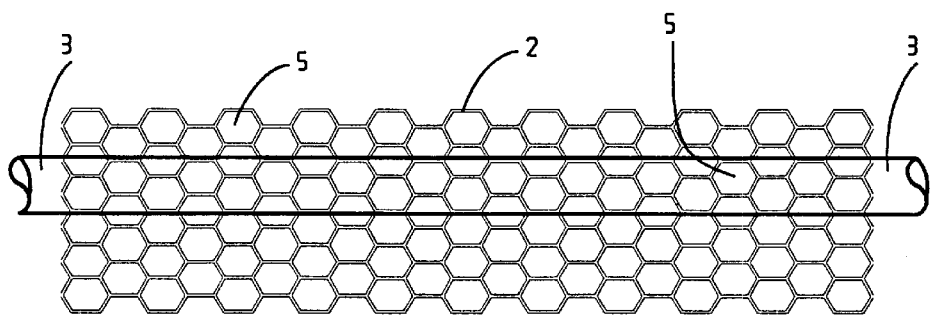
Figure 2A:
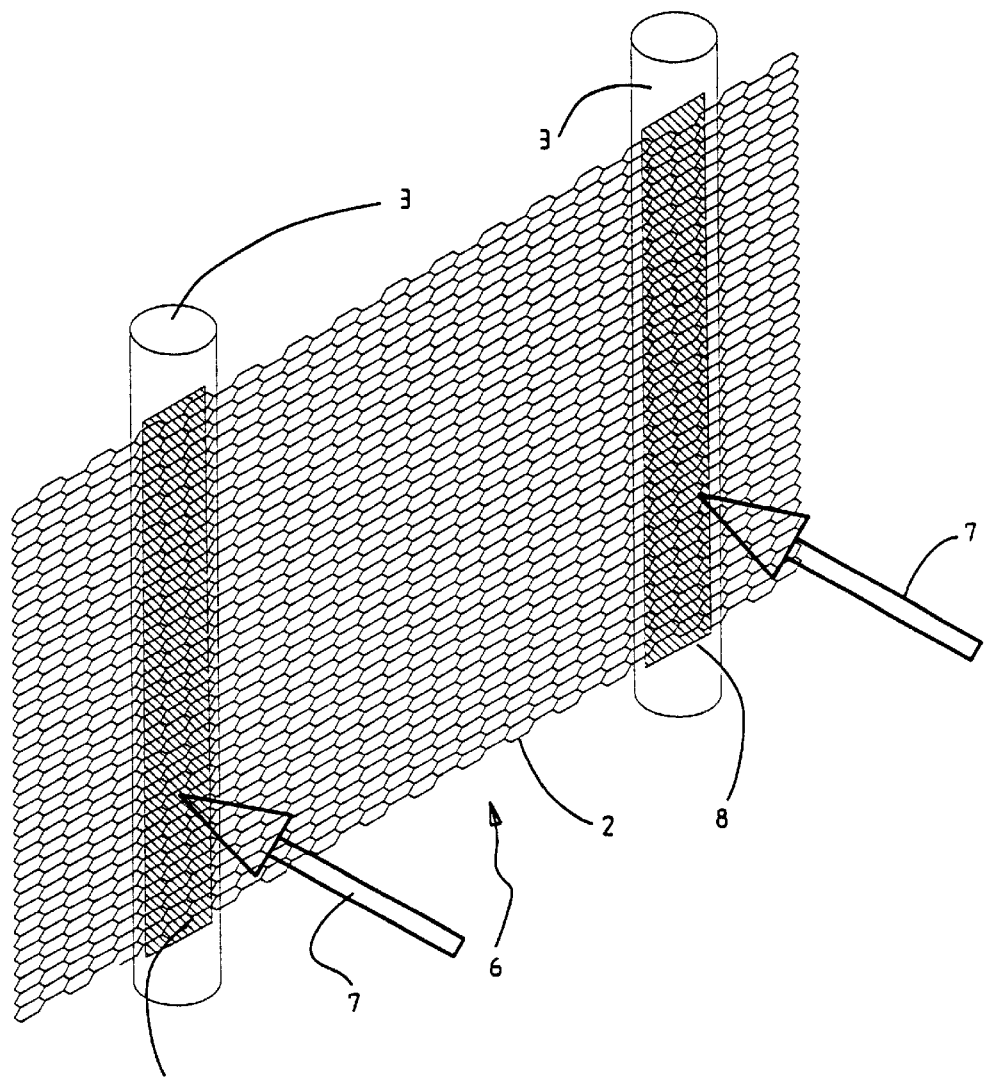
Figure 2B:
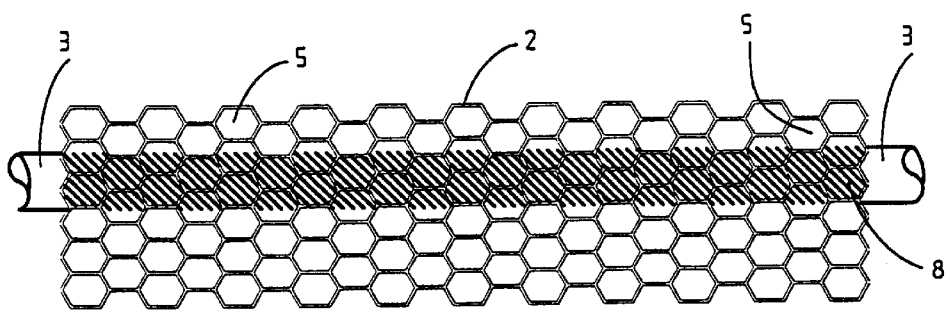

FIG. 1a is a broken-away perspective view of a portion of a convector element according to the prior art, shown in a position wherein the liquid conduit pipe is situated on the upper side of the metal gauze, FIG. 1b shows in perspective view a detail of the underside of the element of FIG. 1a, FIG. 2a is a broken-away perspective view of a portion of a convector element manufactured according to the invented method, shown in a position wherein the liquid conduit pipe is situated on the underside of the metal gauze, and FIG. 2b is a perspective view of a detail of the element of FIG. 2a, shown in corresponding position.

Corresponding components in the drawing are designated with the same reference numerals.

FIG. 1a shows a portion of a convector element 1, for instance intended for mounting in a ceiling, wherein copper liquid conduit pipes 3 are soldered against a copper gauze 2 ("copper expanded material") in accordance with a known soldering technique. Prior to soldering the pipes 3 are fixed against copper gauze 2 using metal wires 4.

FIG. 1b shows a detail of FIG. 1a from the underside at the location of a conduit pipe 3. At the location of the contact surface between gauze 2 and pipes 3 solder material (not visible in the figure) is situated in a quantity such that meshes 5 in gauze 2 are open over the whole surface of the gauze and conduit pipes 3 are visible over their whole length through gauze 2.

FIG. 2a shows a portion of a convector element 6 assembled from copper gauze 2, against which conduit pipes 3 are arranged with a connecting method according to the invention by thermally spraying connecting material through meshes 5 in gauze 2 at the location of pipes 3 in the direction of the arrows 7. The figure further shows fixing wires 4 which are used to fix pipes 3 against gauze 2 prior to and during the thermal spraying. In contrast to soldering, it is relatively simple in the case of thermal spraying in a continuous process to fix the pipes against the gauze in alternative manner, for instance by applying a pressure roller directly preceding the location where the connection is thermally sprayed.

FIG. 2b shows a detail of element 6 of FIG. 2a at the position of a conduit pipe 3, which is not visible as such but the position of which is marked by a strip 8 of thermally sprayed connecting material which completely fills meshes 5 at the location of said pipe.

What is claimed is:

1. Method for connecting a first object to a second object along a common contact surface, wherein the first object comprises at the location of the contact surface a portion for a connecting means to be applied, which portion is accessible along at least one opening in the second object, which method comprises the successive steps of
   (i) providing a first and a second object,
   (ii) holding the first object against the second object along a common surface,
   (iii) melting and atomizing particles of a material suitable as connecting means, and
   (iv) depositing along the at least one opening the material particles in molten state on the first object and on the edge zone respectively the edges of said opening, in a quantity such that in solidified state the deposited material particles form a connection between the first and the second object.

2. Method as claimed in claim 1, characterized in that the third step (iii) comprises arc or plasma spraying.

3. Method as claimed in claim 1, characterized in that the third step (iii) comprises powder or wire spraying.

4. Method as claimed in claim 1 characterized in that the material suitable as connecting means has a melting point or an upper limit of a melting range at a temperature below 2400° C.

5. Method as claimed in claim 4, characterized in that the melting point or the upper limit of the melting range lies at a temperature below 600° C.

6. Method as claimed in claim 5, characterized in that the melting point or the upper limit of the melting range lies at a temperature below 150° C.

7. Method as claimed in claim 1 characterized in that the material suitable as connecting means contains at least one of the metals aluminium, chromium, iron, nickel, copper, zinc, molybdenum, palladium, silver, indium, tin, antimony, lead or an alloy of at least one of these metals.

8. Method as claimed in claim 1 characterized in that the portion of the first object accessible for the connecting means is porous, wherein the pores have dimensions such that the material deposited and solidified in the fourth step (iv) forms a mechanical connection through interlocking of this material with these pores.

9. Method as claimed in claim 8, characterized in that the porous portion is obtained by forming an alloy layer of a material suitable as connecting means with a portion of the first object.

10. Method as claimed in claim 8, characterized in that the porous portion is obtained by forming a coating layer of a material suitable as connecting means on a portion of the first object.

11. Method as claimed in claim 1 characterized in that the second step (ii) is performed immediately preceding and synchronously with the third step (iii).

12. Method as claimed in claim 1 wherein the first object at the location of the contact surface is manufactured substantially from a metal.

13. Method as claimed in claim 1, wherein the second object at the location of the contact surface is manufactured substantially from a metal.

14. Method as claimed in claim 12, characterized in that the metal is selected from the group comprising aluminium, chromium, iron, nickel, copper, molybdenum, palladium, silver, indium, gold, tungsten and an alloy of at least one of these metals.

15. Method as claimed in claim 1 for connecting a tubular object to a gauze support structure, for instance a heat-conducting metal gauze, along a common contact surface, characterized in that in the fourth step (iv) metal particles are deposited onto the tubular object via the mesh in the gauze support.

16. Convector element (6) comprising a heat-conducting metal gauze (2) and at least one liquid conduit pipe (3) connected thereto, characterized in that the liquid conduit pipe (3) is connected to the metal gauze (2) in accordance with a method as claimed in claim 1.

* * * * *